No. 728,576. PATENTED MAY 19, 1903.
E. HOPE.
APPARATUS FOR PREVENTING THE RACING OF MARINE ENGINES.
APPLICATION FILED APR. 12, 1902.
NO MODEL.
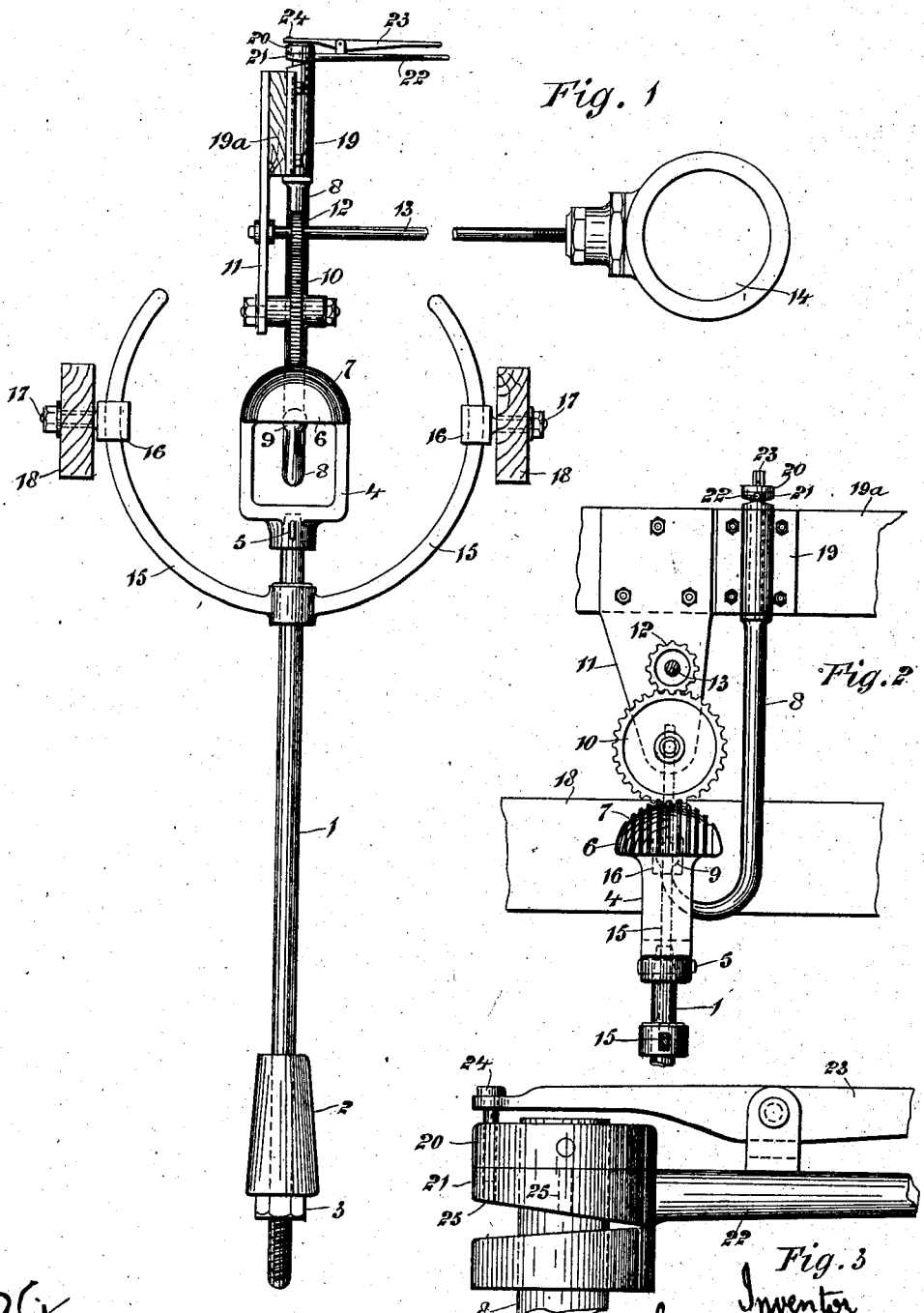

No. 728,576. Patented May 19, 1903.

UNITED STATES PATENT OFFICE.

EDWARD HOPE, OF CHRISTCHURCH, NEW ZEALAND.

APPARATUS FOR PREVENTING THE RACING OF MARINE ENGINES.

SPECIFICATION forming part of Letters Patent No. 728,576, dated May 19, 1903.

Application filed April 12, 1902. Serial No. 102,663. (No model.)

*To all whom it may concern:*

Be it known that I, EDWARD HOPE, a subject of His Majesty the King of Great Britain and Ireland, residing at Christchurch, in the Provincial District of Canterbury, in the Colony of New Zealand, have invented an Improved Apparatus for Preventing the Racing of Marine Engines, of which the following is a specification.

Referring to the drawings, Figure 1 is an elevation of my apparatus, Fig. 2 a side view of the same, and Fig. 3 a detail on a larger scale.

The pendulum-rod 1 has a bob 2, adjustable upon the rod by the nut 3. The head 4 of the pendulum is secured to the rod by the key 5 and has a hemispherical top 6. Parallel grooves 7 are cut in the periphery of this top 6, which is suspended on a hooked spindle 8, a hemispherical recess being provided in the top to receive the spherical end 9 of the spindle 8. The ridges formed by the grooves 7 mesh with the toothed wheel 10, which is pivoted upon the bracket 11 and meshes with a pinion 12, fixed upon the valve-spindle 13. The valve 14 is operable by the spindle 13. The yoke 15 is fixed to the pendulum-rod 1 and is circular in form, its center being coincident with the center of the recess for the spherical end 9. The sides of the yoke pass freely through their guides 16, which are made to swivel on stems 17, passing through supporting-beams 18.

The hooked spindle 8 is square in cross-section where it passes through its bracket 19 and circular where it projects above the said bracket. A collar 20 is secured upon the spindle 8, and the cam-head 21 of a lever 22 fits upon the said spindle beneath the collar. The lower face of the cam-head 21 and the top of the bracket 19 are made with a slope, as shown. The brackets 11 and 19 are fixed to the beam 19ª. A lever 23 is pivoted upon the lever 22 and at its outer end carries a pin 24. Holes 25 in the collar 20 and head 21 receive the pin 24.

The apparatus is so designed that the rolling of a vessel will not rotate the wheels 10 and 12, which are operated only when the vessel pitches. The valve 14 is thus regulated or shut only when the vessel pitches.

The apparatus is fitted into a vessel with the plane of the yoke 15 athwartships, and its operation is as follows: The pendulum keeps its vertical or approximately vertical position by the force of gravity, and when a vessel pitches the wheels 10 and 12 are revolved and the valve 14 operated by the screw-spindle 13. When the vessel rolls, the ridges 7 merely slide between the teeth of the wheel 10 without rotating the same, so that the valve 14 is not operated by the rolling motion. The guides 16 slide freely upon the sides of the yoke 15 when the vessel rolls and rotate on their stems 17 when the vessel pitches, freedom of movement in all directions being thus provided. The vertical position of the pendulum is not disturbed by the said guides; but the sides of the yoke passing through the guides 16 prevent the pendulum from rotating, and the ridges 7 are thereby kept at right angles to the plane of the wheel 10.

The lever 22 is for the purpose of throwing the ridges 7 out of gear with the wheel 10 and is operated by depressing the lever 23 to withdraw the pin 24 from its hole 25. The lever 22 is then turned around until the collar 20, and with it the spindle 8, is lowered until the ridges 7 are out of gear. The lever 22 is then locked by allowing the pin 24 to fall into another hole 25.

I am aware that pendulums have been used for preventing the racing of marine engines, and I do not claim such mechanism broadly, but confine myself to the improvements specified herein.

What I do claim as my invention, and desire to secure by Letters Patent, is—

1. An apparatus for preventing the racing of marine engines, provided with a valve, a pendulum having a hemispherical top adapted to receive the spindle, and parallel ridges on the periphery of the top gearing with a toothed wheel; substantially as described.

2. In apparatus for preventing the racing of marine engines provided with a valve, a spindle having a spherical end, a pendulum having a hemispherical top the center of which is coincident with the center of the spherical end of the spindle, parallel ridges on the periphery of the said top gearing with a toothed wheel, and a recess in the pendulum-top to receive the said spherical end of the hooked spindle, substantially as set forth.

3. In apparatus for preventing the racing of marine engines provided with a valve in combination, a pendulum suspended by a recess in its top upon the spherical end of the hooked spindle, a yoke fixed to the pendulum the center of the said yoke being coincident with the said spherical end of the hooked spindle, guides for the sides of the yoke capable of pivoting on their stems, substantially as set forth.

4. The combination in apparatus such as described herein provided with a valve, of a hooked spindle having a spherical end, a pendulum having a hemispherical top the center of which is coincident with the spherical end of the hooked spindle, parallel ridges on the periphery of the said top gearing with a toothed wheel, a recess in the pendulum-top to receive the said end of the hooked spindle, a yoke fixed to the pendulum the center of the said yoke being coincident with the said spherical end of the hooked spindle and guides for the sides of the yoke capable of pivoting on their stems, substantially as set forth.

5. In apparatus for preventing the racing of marine engines, a pendulum having a hemispherical top, parallel ridges on the periphery of the said top gearing with a toothed wheel, and means for throwing the said hemispherical top out of gear with the toothed wheel, substantially as set forth.

6. In apparatus such as described herein, in combination, a spindle hooked at its lower end and having a spherical end, the other end having a part square in cross-section fitting into a bracket with a sloping top, and having its extremity circular in section, a collar fixed to the end of this circular part of the hooked spindle, and a lever having a cam-shaped end fitting upon the spindle beneath the said collar substantially as set forth.

7. In apparatus such as described herein, in combination, a spindle hooked at its lower end and having a spherical end the other end having a part square in cross-section fitting into a bracket and having its extremity circular in section, a collar fixed to the end of this circular part of the spindle, a lever having a cam-shaped end fitting upon the spindle beneath the said collar, a second lever pivoted upon the cam-lever, a pin upon the end of this second lever, and holes in the said collar and cam to receive the said pin, substantially as set forth.

8. In apparatus such as described herein, in combination, a spindle having a spherical end, a pendulum having a hemispherical top the center of which is coincident with the center of the spherical end of the spindle, parallel ridges on the periphery of the said top gearing with a toothed wheel, a recess in the pendulum-top to receive the said spherical end of the spindle a pinion gearing with the toothed wheel, a screwed spindle upon which the pinion is fixed and a stop-valve operated by the screwed spindle, substantially as set forth.

9. The combination, in apparatus for preventing the racing of marine engines, of a hooked spindle having a spherical end, a pendulum having a hemispherical top the center of which is coincident with the spherical end of the spindle, parallel ridges on the periphery of the said top gearing with a toothed wheel, a recess in the pendulum-top to receive the said end of the spindle, a yoke fixed to the pendulum the center of the said yoke being coincident with the said spherical end of the spindle, guides for the sides of the yoke capable of pivoting on their stems, a part of the hooked spindle square in cross-section fitting into a bracket and having its extremity circular in section, a collar fixed to the end of this circular part of the hooked spindle, and a lever having a cam-shaped end fitting upon the spindle beneath the said collar, substantially as set forth.

10. The combination, in apparatus for preventing the racing of marine engines, of a hooked spindle having a spherical end, a pendulum having a hemispherical top the center of which is coincident with the spherical end of the spindle, parallel ridges on the periphery of the said top gearing with a toothed wheel, a recess in the pendulum-top to receive the said end of the spindle, a yoke fixed to the pendulum the center of the said yoke being coincident with the said spherical end of the spindle, guides for the sides of the yoke capable of pivoting on their stems, a part of the hooked spindle square in cross-section fitting into a bracket and having its extremity circular in section, a collar fixed to the end of this circular part of the hooked spindle, a lever having a cam-shaped end fitting upon the spindle beneath the said collar, a pinion gearing with the said toothed wheel, a screwed spindle upon which the pinion is fixed and a stop-valve operated by the screwed spindle, substantially as set forth.

In witness whereof I have hereunto set my hand in presence of two witnesses.

EDWARD HOPE.

Witnesses:
A. H. HART,
T. R. SMITH.